R. G. ROSE.
NUT LOCK.
APPLICATION FILED NOV. 6, 1920.
1,389,845.
Patented Sept. 6, 1921.
Fig. 1.
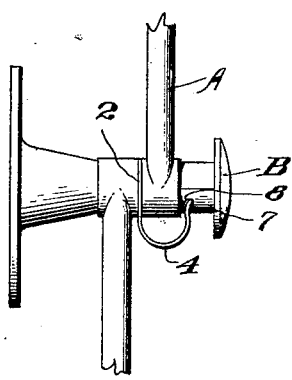
Fig. 2.
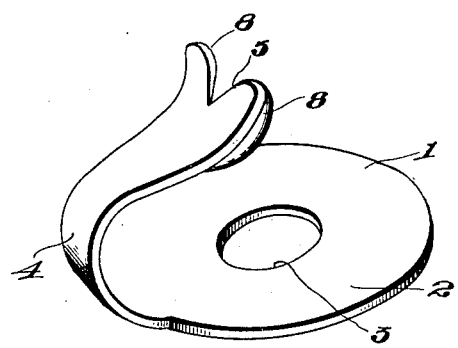
Fig. 3.
Fig. 4.
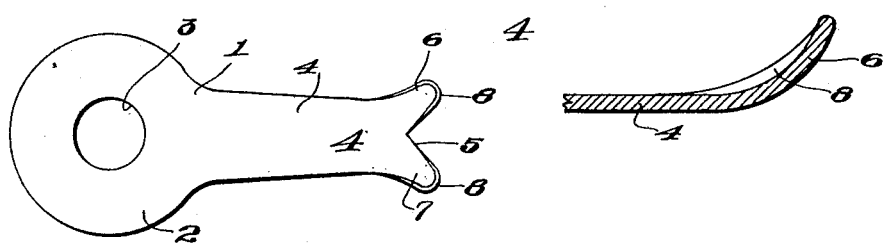
Ralph G. Rose.
INVENTOR
BY Victor J. Evans
ATTORNEY

UNITED STATES PATENT OFFICE.

RALPH G. ROSE, OF CATESBY, OKLAHOMA.

NUT-LOCK.

1,389,845.   Specification of Letters Patent.   Patented Sept. 6, 1921.

Application filed November 6, 1920. Serial No. 422,311.

*To all whom it may concern:*

Be it known that I, RALPH G. ROSE, a citizen of the United States, residing at Catesby, in the State of Oklahoma, have invented new and useful Improvements in Nut-Locks, of which the following is a specification.

This invention relates to nut locks and an object of the invention is to provide a nut lock which is simple in construction, and may be manufactured and sold at a comparatively small cost, and a nut lock which is particularly designed for use in connection with vehicle tops.

It is well known that the nuts used in clamping the stays or braces of vehicle tops frequently work loose during travel of the vehicle and become lost or permit rattling of the braces and their supporting studs, and it is an object of this invention to provide a simple, efficient and durable nut lock which will prevent the accidental rotation of the nuts upon the brace carrying studs.

Other objects of the invention will appear in the following description and in the accompanying drawings wherein:

Figure 1 is a side elevation of the nut lock showing it applied.

Fig. 2 is an enlarged perspective of the nut lock.

Fig. 3 is a plan view of the blank from which the nut lock is formed.

Fig. 4 is an enlarged section through a portion of the tongue.

Referring more particularly to the drawing the improved nut lock 1 is formed of a single blank of spring steel and is cut to provide a substantial disklike body 2 provided with a central perforation 3 which is adapted to receive therethrough the carrying stud for the top braces indicated at A of a vehicle structure. A tongue 4 is formed integrally on the body 2 and projections from one side of the body having its outer end split as shown at 5 to provide a pair of substantial right angle disposed edge portions for engagement with the sides of a nut B, one upon each side of a corner of the nut, to hold the nut against accidental rotation. The tongue 4 is curved over the body 2 as clearly shown in Figs. 1 and 2 of the drawings, and the edges of the projections 6 and 7 formed by the split of the end of the tongue are rolled, as shown at 8 to provide cam surfaces for engagement with the sides of the nut B to permit the projections 6 and 7 to spring over the corners of the nut during the mounting of the nut upon the stud; however, when the nut is properly mounted the straight edge formed by the split 5 engages the sides of the nut and prevents unscrewing rotation thereof.

Having thus described my invention what I claim is:

1. A nut lock formed of a single piece of spring steel and comprising a perforated disklike body, a tongue formed on said body and curved for facilitating its free end over the body, the free end of said tongue being split and providing angularly projecting extensions having their inner facing edges disposed at substantially right angles, the outer side edge and ends of said extensions being rounded to provide cam surfaces.

2. A nut lock washer having a spring tongue extension terminating into a splitted extremity bulged on opposite sides of the split to provide cam surfaces.

In testimony whereof I affix my signature.

RALPH G. ROSE.